US005389785A

United States Patent [19]

Steiner et al.

[11] Patent Number: 5,389,785

[45] Date of Patent: Feb. 14, 1995

[54] ION FILTER APPARATUS AND METHOD OF PRODUCTION THEREOF

[75] Inventors: Urs Steiner, Sunnyvale; Nigel P. Gore, San José, both of Calif.; Helmut Rother, Osterholz-Scharmbeck, Germany

[73] Assignee: Finnigan Corporation (a Virginia corporation), San Jose, Calif.

[21] Appl. No.: 54,523

[22] Filed: Apr. 28, 1993

[30] Foreign Application Priority Data

May 26, 1992 [EP] European Pat. Off. .......... 92108815

[51] Int. Cl.[6] .......................... B01D 59/44; H01J 49/00

[52] U.S. Cl. .................................................. 250/292

[58] Field of Search ................................ 250/292, 281

[56] References Cited

U.S. PATENT DOCUMENTS

| | | | |
|---|---|---|---|
| 2,520,813 | 8/1950 | Rudenberg | 250/396 R |
| 3,757,115 | 9/1973 | Ball | 250/292 |
| 4,158,771 | 6/1979 | Beeck et al. | 250/294 |
| 4,885,470 | 12/1989 | Abbott | 250/396 R |
| 4,949,047 | 8/1990 | Hayward et al. | 328/233 |
| 5,315,120 | 5/1994 | Potter | 250/292 |

*Primary Examiner*—Bruce C. Anderson
*Attorney, Agent, or Firm*—Flehr, Hohbach, Test, Albritton & Herbert

[57] ABSTRACT

The invention relates to an ion filter and a method for the production of the ion filter. The ion filter comprises a plurality of elongated solid, rod assemblies. Typically, four rod assemblies, corresponding to four rod electrodes, are utilized. Each rod assembly has a curved rod surface, and at least two abutment surfaces. In one embodiment, the rod is hyperbolic in curvature. These surfaces are formed with one profiled grinding tool simultaneously in such a manner and angle of contact from a processing direction such that no undercuts are formed from this processing direction. The abutment surfaces are shaped such that one abutment surface of one rod assembly can be aligned with another abutment surface of another rod assembly when the rod surfaces are directed toward a longitudinal axis located in the interior of the ion filter. The rod assemblies are electrically insulated from each other with an insulating piece adhesively bonded to each rod assembly.

18 Claims, 3 Drawing Sheets

ION FILTER APPARATUS AND METHOD OF PRODUCTION THEREOF

The invention relates to an ion filter, especially for a mass spectrometer or mass analyzer, having a longitudinally divided assembly (hereinafter, all references to "longitudinally divided body" are equivalent to "longitudinally divided assembly") for the formation of especially four elongate, solid rod assemblies (hereinafter, all references to "part body" are equivalent to "rod assembly"), the part bodies exhibiting in each instance a surface which is hyperbolic or similarly curved in cross-section and which is elongate and directed towards the interior of the body, as well as abutment surfaces to rest on corresponding surfaces of the adjacent part bodies. The invention further relates to a process for the production of an ion filter.

BACKGROUND OF THE INVENTION

Mass spectrometers for the investigation and for the detection of ions of specified mass numbers exhibit an ion source, an ion detection direction and an ion filter. The latter may be designed as a multipole, especially a quadrupole. The ions to be analyzed are directed through the multipole on their path to the detection device. Within the multipole, the ions experience a specified deflection. In the event of the use of a quadrupole, four elongate profiled surfaces which are directed toward one another are provided, which exhibit different electrical potentials. Surfaces which are hyperbolic in cross-section are particularly favorable for the design of the desired electric field between the pole surfaces. In some cases, surfaces which are circular in cross-section are employed.

For the purposes of specified practical applications, it is important to keep the dimensional tolerances of the finished ion filter as small as possible. The aim is to achieve tolerances of approximately one micrometer (1/1,000 mm ).

DE-OS 2,625,660 (corresponding to U.S. Pat. No. 4,158,771) discloses an ion filter which is designed as a quadrupole and which comprises, in total, two or four elongate segments. These are joined together in the region of mutually engaging projections and depressions. This gives, upon assembly, a certain degree of positional centering of the segments in relation to one another. The design of the projections and depressions is extremely difficult from the point of view of production technology, having regard to the required small tolerances. Thus, each part must be processed in the region of mutually parallel but remote surfaces and moreover mutually perpendicular surfaces. The best possible dimensional tolerances which result therefrom are not acceptable.

OBJECT AND SUMMARY OF THE INVENTION

The object of the present invention is to provide an ion filter and a process for the production thereof, whereby the attainable dimensional tolerances and thus the attainable accuracy of measurement in subsequent operation are improved.

To achieve the object, the ion filter according to the invention is defined in that the hyperbolic surface or curved surface and the abutment surfaces of a part body are disposed so that, from at least one common view, especially from a direction perpendicular to at least one arbitrarily selectable partial region of the hyperbolic surface or curved surface, they exhibit no undercuts, or no undercuts are visible from this direction. The process according to the invention is defined in that the hyperbolic surface and the abutment surfaces of a part body in each instance are eroded resting against a common, appropriately profiled tool, especially a grinding tool, to a defined measure. Those surfaces of the ion filter which are critical with respect to their tolerances are the hyperbolic surface for the design of the electric field and the abutment surfaces, in the region of which the part bodies rest on one another. The invention permits the processing of these surfaces, where they belong to a part body, with one and the same tool and in each instance in the same working step. Thus, using an appropriately profiled grinding disk, it is possible to process at the same time the hyperbolic surface and the abutment surfaces of a part body. The construction permits a uniform erosion of the surfaces and of the grinding disk and as a result of this, ensures the highest possible precision of the processing.

Especially advantageous is the design of the ion filter as a longitudinally divided quadrupole with four part bodies to be Joined together. In principle, it is also possible to employ other numbers of poles or other numbers of part bodies, for example two with two poles each. Each part body exhibits a surface which is hyperbolic in cross-section as well as abutment surfaces which are disposed on both sides thereof. The part bodies are designed in each instance to be substantially identical. In a similar manner, the abutment surfaces provided on one side of the hyperbolic surface correspond to those disposed on the other side. The hyperbolic surface and the abutment surfaces of a part body are disposed, especially with respect to their inclination in relation to one another, so that they can be reached from one and the same direction by a common grinding tool. The ion filter according to the invention does not require any further subsequent processing and exhibits the highest mechanical precision. A subsequent coating is not required. The operation of the ion filter is considerably improved.

Advantageously, the part bodies comprise in each instance electrically conductive material, especially a metal or a metal alloy with a low temperature coefficient of expansion. The part bodies are electrically insulated in relation to one another. Advantageously, of the abutment surfaces lying between two part bodies the abutment surfaces belonging to one part body are electrically insulated in relation to the latter, e.g. by insulating pieces made of quartz.

According to a particular embodiment of the invention, the abutment surfaces do not extend over the entire length of the part bodies. Rather, in the longitudinal direction of a part body a plurality of, especially four, insulating pieces with bearing pieces are disposed to follow one another at a spacing. In this case, the bearing pieces exhibit the required abutment surfaces. As a result of the spacings provided between the insulating pieces and thus between the abutment surfaces resting on one another, the internal space of the ion filter between the part bodies remains accessible, whereby good high-vacuum conditions are created; this means that a rapid pumping out of the molecules is assured.

DETAILED DESCRIPTION OF THE PREFERRED EMBODIMENTS

Figure 2:
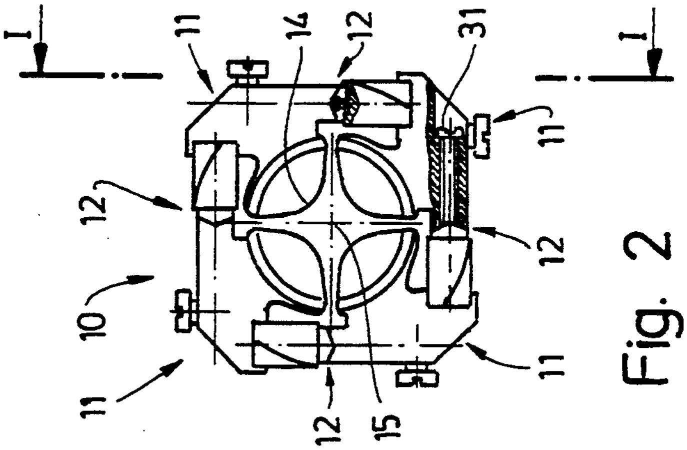
FIG. 2 shows a plan view onto an end face of the ion filter according to FIG. 1, partly cut away.
Figure 1:
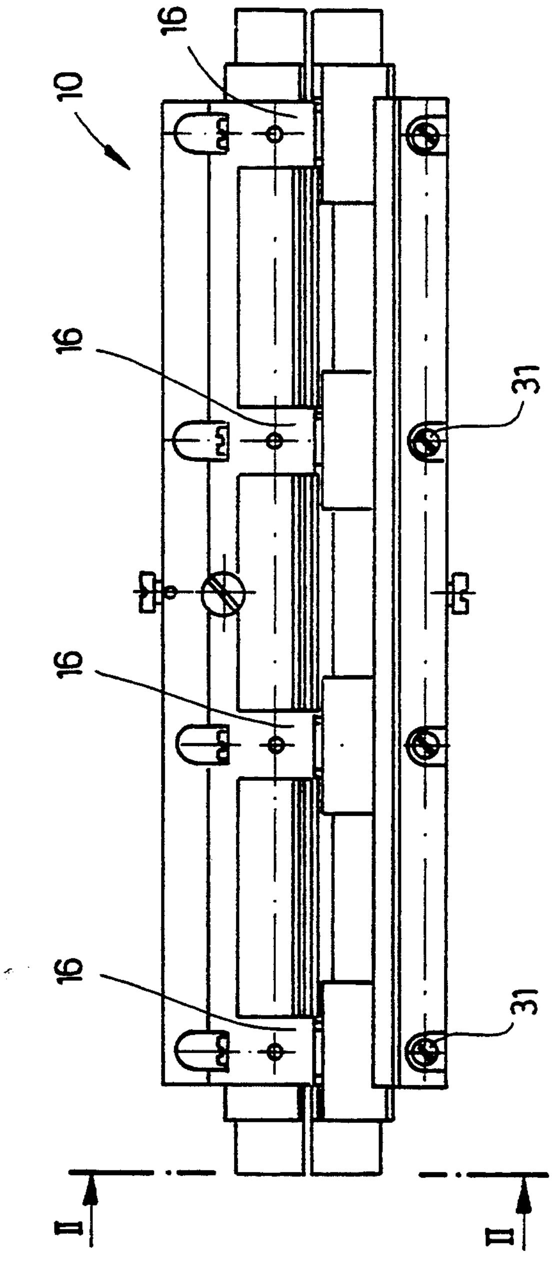
FIG. 1 shows a side elevation of an ion filter according to the invention.

Reference is made, in the first instance, to FIGS. 1 and 2. These figures show an ion filter 10 for a mass spectrometer. The ion filter is designed as a quadrupole with four identically formed part bodies 11 in each instance. These rest on one another in the region of abutment surfaces 12.

Figure 4:
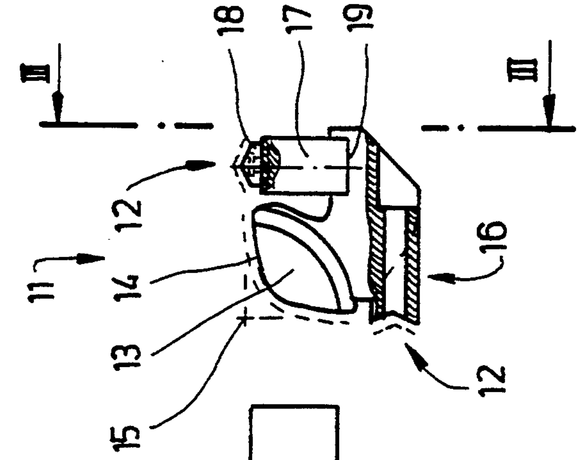
FIG. 4 shows a plan view onto an end face of the part body according to FIG. 3, partly cut away.
Figure 3:
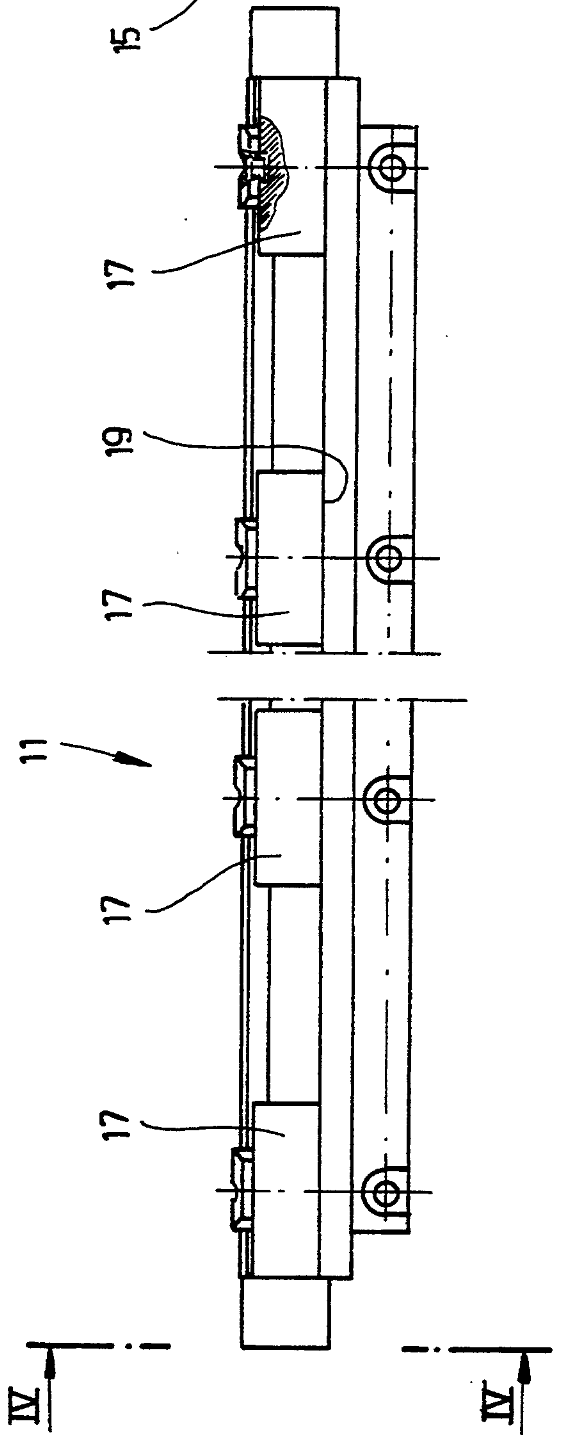
FIG. 3 shows a side elevation of one of four part bodies for the formation of the ion filter.
Figure 5:
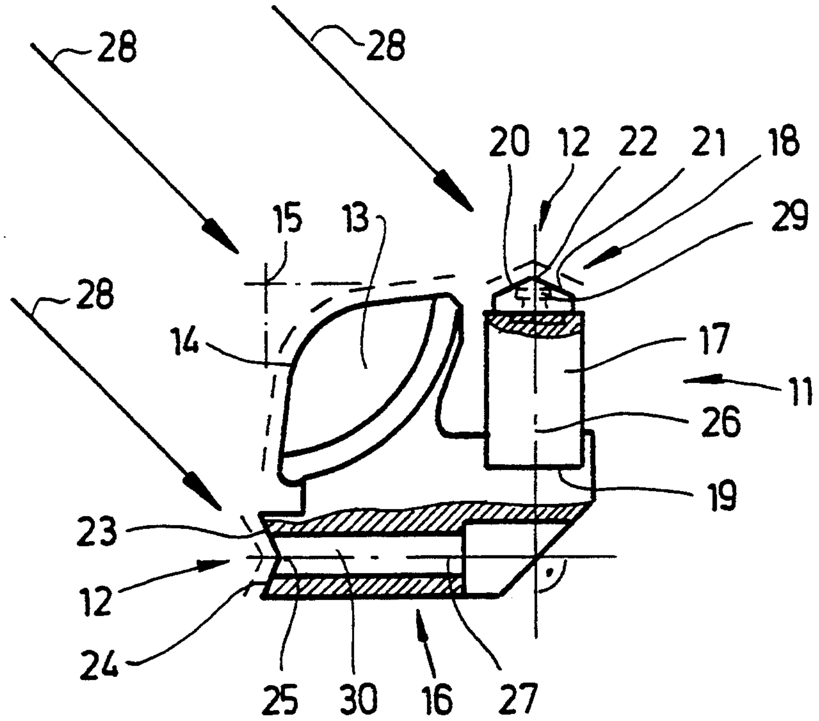
FIG. 5 shows an enlarged elevation according to FIG. 4.

FIGS. 3 to 5 show an individual part body 11. This exhibits an elongated, solid profile rod 13 having a rod surface 14 which is hyperbolic in cross-section (hyperbolic surface). The hyperbolic surfaces 14 come, in the fully assembled ion filter 10, to lie directed into the interior (FIG. 2). The ions emitted from an upstream ion source move between them and substantially parallel to the longitudinal axis 15 (shown in FIGS. 2, 4, and 5 as lying normal to the plane of drawing).

The hyperbolic surface 14 covers an angle of somewhat less than 90° in a direction transversely to the longitudinal axis 15. The abutment surfaces 12 are disposed in an imaginary continuation of the hyperbolic surface 14 transversely to the longitudinal axis 15 on both sides. To this end, the profile rod 13 exhibits four abutment bodies 16 which follow one another at a spacing. A surface of the abutment body 16, which surface lies in the imaginary continuation of the hyperbolic surface 14, is designed as abutment surface 12.

Four insulating pieces 17 are provided perpendicular to the abutment bodies 16, to the right of the profile rod 13 in FIG. 4. These carry in the upper region, that is to say in the imaginary continuation of the hyperbolic surface 14 outwards, a bearing piece 18 with an appropriate abutment surface 12.

Spacings are provided in each instance in the direction of the longitudinal axis 15 between the insulating pieces 17. In this way, stresses caused by thermal expansion can be kept small.

The insulating pieces 17 are disposed in a particular manner relative to the interior of the ion filter 10. The ions passing the filter are screened off in relation to the insulating pieces 17. Seen from a central axis (longitudinal axis 15), the insulating pieces 17 are disposed to be masked by the hyperbolic surfaces 14. Thus, the insulating pieces 17 cannot be struck by ions and charged up. A distortion of the electric field between the hyperbolic surfaces 14 is avoided.

The insulating pieces 17 are preferably made of quartz, of approximately parallelepipedic form and let into the cross-section of the profile rod 30 in the region of depressions 19. The profile rod 13 is made of metal, integrally with the abutment bodies 16. Preferably, a metal or an alloy with a low temperature coefficient of expansion is employed. Especially advantageous is the use of molybdenum produced in a sintering process or of an Ni/Fe alloy available under the tradename Vacodil from the company Vacuumschmelze GmbH, with a proportion of 36% Ni. The insulating piece 17 is adhesively bonded with the profile rod 13 or in the depression 19. The fact that the part body 11 is made of metal permits a good high precision processing. The insulating pieces 17 comprising quartz are small in comparison with the remainder of the part body 11, so that only small dielectric losses can occur.

The abutment surfaces 12 at the abutment bodies 16 and the bearing pieces 18 are designed in a particular manner, cf. FIG. 5. The purpose of the abutment surfaces is to facilitate self-centering upon the joining together of the individual part bodies 11. The abutment surfaces 12 at the abutment body 16 accordingly fit precisely to the contour of the abutment surfaces 12 at the bearing pieces 18. A favorable feature comprises pairings of convex surfaces on the one hand, in this case bearing pieces 18, and concave abutment surfaces on the other hand, in this case abutment bodies 16. FIG. 2 shows the abutment surfaces 12 resting on one another in each instance.

In the present illustrative embodiment, the abutment surfaces 12 of the bearing pieces 18 are designed as mutually turned down partial surfaces 20, 21, which adjoin one another in the region of an edge 22. The edge 22 extends parallel to the longitudinal axis 15 into the plane of the drawing (FIG. 5). In a similar manner, the abutment bodies 16 exhibit at abutment surfaces 12, mutually turned down partial surfaces 23, 24, which again adjoin one another in the region of an angle 25. The partial surfaces 20, 21 on the one hand and 23, 24 on the other hand are oriented so that in each instance angle bisectors 26, 27 lying between them are oriented at an angle of 90° in relation to one another.

The hyperbolic surface 14 and the partial surfaces 20, 21, 23, 24 (at the same time the abutment surfaces 12) are processed in one working step in the production of the ion filter. For illustrative purposes, broken lines are shown outside the corresponding surfaces and parallel to these. The processing tool employed is preferably an appropriately profiled grinding disk, which is lowered "frontally" onto the hyperbolic surface 14 or in a direction as shown by the arrows 28 onto the part body 11, more precisely onto the aforementioned hyperbolic and partial surfaces. Expediently, the part body 11 is set up in advance as a high quality cast component and the insulating pieces 17 with the bearing pieces 18 are adhesively bonded thereto. The resulting prepared part body 11 is then eroded to the final measure in the described manner.

In order that the described processing should be possible with only one tool for all surfaces, these surfaces, seen from a specified direction, must be visible or exhibit no undercuts. In the present case, this is the direction determined by the arrows 28. In principle, what matters is the direction from which the processing tool is lowered onto the surfaces to be processed.

In this case, the partial surfaces 21 and 23 are critical surfaces. These must exhibit a certain minimum angle of inclination in relation to the direction 28. Otherwise, a precise processing is no longer possible. In theory, the angle must be greater than zero; in practice, it should be at least 5°. In the present case, there is an angle of 135° between the partial surfaces 20 and 21. This corresponds to an angle between the direction 28 and the partial surface 21, of 22.5°. Further possible angles for the partial surfaces 20, 21 in relation to one another lie between 95° and 175°. The possible angles between the direction 28 and the partial surface 21 are obtained in a corresponding manner.

The angle between the partial surfaces 23, 24 forming a concave surface is analogous to this. This angle invariably corresponds to the angle between the partial surfaces 20, 21. Otherwise, the abutment surfaces would not rest on one another.

The part bodies 11 are firmly connected to one another by screw connections. For this purpose, each bearing piece 18 exhibits an internal thread 29. The abutment bodies 16 are provided with a through bore 30 in the direction of the angle bisector 27. By means of threaded screws 31 (not shown in FIG. 5) inserted into the bores 30 the abutment bodies 16 are firmly screwed to the bearing pieces 18 of the adjacent part body 11. In the production of the screw connection, a self-centering of the part bodies 11 relative to one another takes place through the action of the above described abutment surfaces 12 or partial surfaces 20, 21, 23, 24. A precise orientation of the parts relative to one another, for example by a so-called jigging, is not required.

The described arrangement of the surfaces 14, 12, 20, 21, 23, 24 to be processed has a further advantage. In the event that in the course of operation instances of damage to the surfaces should occur, the surfaces may be reground to a certain extent without this leading to alteration of the position and arrangement of the surfaces in relation to one another. There only occur slight displacements of the position of the internal thread 29 and of the bore 30 relative to the angle bisectors 26, 27. However, these are insignificant having regard to the tolerances within the screw connection.

According to FIGS. 1 and 3, four connecting regions with appropriate abutment bodies 16 and insulating pieces 17 are provided over the length of the ion filter 10. Between these (seen in the longitudinal direction) a clear spacing is provided in each instance, so that the profile rods 13 and the hyperbolic surfaces 14 respectively are not fully enclosed and good high-vacuum conditions are created.

We claim:

1. An ion filter for a mass spectrometer or mass analyzer, comprising:

- a longitudinally divided assembly having a longitudinal axis along the center of the longitudinally divided assembly including a plurality of elongated rod assemblies; and
- each rod assembly including:
  - a longitudinally elongated and cross-sectionally curved rod surface, the rod surface directed towards the longitudinal axis along an imaginary processing line normal to the apex of the rod surface, and
  - abutment surfaces configured to be aligned with corresponding abutment surfaces of adjacent rod assemblies, wherein the rod surface and the abutment surfaces of each rod assembly are disposed such that no undercut on any arbitrarily selected region of the rod surface and the abutment surfaces is visible from a direction parallel to the processing line.

2. The ion filter as in claim 1, wherein for each rod assembly, one abutment surface is convex and the other abutment surface is concave and wherein the convex abutment surface of a rod assembly rest against a corresponding, concave abutment surface of an adjacent rod assembly.

3. The ion filter as in claim 2, wherein the concave abutment surfaces exhibit a V-shaped cross-section, and the convex abutment surfaces are designed to rest against the concave abutment surfaces with a positive fit.

4. The ion filter as in claim 2 or 3, wherein the abutment surfaces are designed parallel and flat relative to the longitudinal axis.

5. The ion filter as in claim 2, wherein the convex and concave abutment surfaces are formed in a cross-sectional plane of the longitudinally divided assembly and of the rod assemblies, respectively.

6. The ion filter as in claim 2 wherein, for each rod assembly, the convex abutment surface is located on one side of and adjacent to the rod surface, and the concave abutment surface is located on the opposite side of and adjacent to the rod surface, wherein for all rod assemblies, the abutment surfaces and the rod surface are cross-sectionally spaced apart from each other within the longitudinally divided assembly, and for each rod assembly, a plurality of abutment surfaces are spaced apart from each other along a longitudinal direction of a rod assembly.

7. The ion filter as in claim 2 wherein the abutment surface for each rod assembly are formed of adjacent and mutually turned down partial surfaces.

8. The ion filter as in claim 7, wherein the partial surfaces of an abutment surface exhibit in relation to one another an angle of 95° to 175°.

9. The ion filter as in claim 1 wherein the rod surfaces are hyperbolic in cross-sectional curvature and identical to each other, and the abutment surfaces are identical to each other for the processing of all rod assemblies with one and the same tool contour.

10. The ion filter as in claim 1 wherein the rod assemblies comprise electrically conductive material, and, of the abutment surfaces in direct contact with each other between two rod assemblies, at least one of the abutment surfaces belonging to a rod assembly provides electrical insulation between the rod assemblies.

11. The ion filter as in claim 1 wherein, except for the insulating piece, rod assemblies comprise an electrically conductive metal alloy or steel alloy.

12. The ion filter as in claim 1 wherein, for each rod assembly, the abutment surfaces are provided on opposite sides of the rod surface and in alignment in the longitudinal direction of the rod surface.

13. An ion filter for a mass spectrometer or mass analyzer, comprising:

- a longitudinally divided assembly having a longitudinal axis along the center of the longitudinally divided assembly including a plurality of elongated rod assemblies;
- each rod assembly including:
  - a longitudinally elongated and cross-sectionally curved rod surface, the rod surface directed towards the longitudinal axis along an imaginary processing line normal to the apex of the rod surface, and
  - abutment surfaces configured to be aligned with corresponding abutment surfaces of adjacent rod assemblies, wherein the rod surface and the abutment surfaces of each rod assembly are disposed such that no undercut on any arbitrarily selected region of the rod surface and the abutment surfaces is visible from a direction parallel to the processing line; and
- an insulating piece for electrically insulating the rod assemblies from each other, wherein the insulating piece is composed of quartz.

14. The ion filter as in claim 13, further comprising a bearing piece having a first end and a second end, wherein the first end is the abutment surface and the second end is adhesively bonded to the insulating piece.

15. The ion filter as in claim 13 or 14, wherein the insulating piece and bearing piece for each rod assembly are spaced from the insulating piece and bearing piece of another rod assembly, and a plurality of insulating pieces and bearing pieces are spaced along a longitudinal direction of a rod assembly.

16. An ion filter for a mass spectrometer or mass analyzer comprising:

a longitudinally divided assembly with a longitudinal axis along the elongated center of the longitudinally divided assembly for the formation of four elongated rod assemblies; and each rod assembly including:

a longitudinally elongated and cross-sectionally hyperbolic rod surface wherein the apex of the rod surface is directed towards the longitudinal axis along an imaginary processing line normal to the apex of the rod surface, an insulating piece for electrically insulating the rod assemblies from each other, wherein the insulating piece is configured in the rod assembly such that the insulating piece is masked by the rod surfaces when viewed from the longitudinal axis to substantially prevent ions from contacting the insulating piece, a bearing piece having a first end and a second end, wherein the first end is an abutment surface and the second end is adhesively bonded to the insulating piece, wherein the abutment surface is configured to be aligned with a corresponding abutment surface of an adjacent rod assembly, wherein the rod surface and the abutment surfaces of each rod assembly are disposed such that no undercut on any arbitrarily selected region of the rod surface and abutment surfaces is visible from a direction parallel to the processing line.

17. A mass spectrometer as in claims 1 and 16 comprising: an ion source for forming and gating ions into the ion filter and, an ion detection device.

18. An ion filter for a mass spectrometer or mass analyzer, comprising:

a longitudinally divided assembly having a longitudinal axis along the center of the longitudinally divided assembly including a plurality of elongated rod assemblies;

each rod assembly including:

a longitudinally elongated and cross-sectionally curved rod surface, the rod surface directed towards the longitudinal axis along an imaginary processing line normal to the apex of the rod surface, and abutment surfaces configured to be aligned with corresponding abutment surfaces of adjacent rod assemblies, wherein the rod surface and the abutment surfaces of each rod assembly are disposed such that no undercut on any arbitrarily selected region of the rod surface and the abutment surfaces is visible from a direction parallel to the processing line; and an insulating piece for electrically insulating the rod assemblies from each other, wherein the insulating piece is configured in the rod assembly such that the insulating piece is masked by the rod surfaces when viewed from the longitudinal axis to substantially prevent ions from contacting the insulating piece.

* * * * *